United States Patent
Sugiura et al.

(10) Patent No.: US 7,129,661 B2
(45) Date of Patent: Oct. 31, 2006

(54) MOTOR DRIVER, MOTOR DRIVEN BY THE MOTOR DRIVER, AND APPARATUS EMPLOYING THE MOTOR

(75) Inventors: Kenji Sugiura, Osaka (JP); Masahiro Yasohara, Hyogo (JP)

(73) Assignee: Matsushita Electric Industrial Co., Ltd.

( * ) Notice: Subject to any disclaimer, the term of this patent is extended or adjusted under 35 U.S.C. 154(b) by 0 days.

(21) Appl. No.: 10/555,178

(22) PCT Filed: Apr. 27, 2004

(86) PCT No.: PCT/JP2004/006062

§ 371 (c)(1),
(2), (4) Date: Nov. 1, 2005

(87) PCT Pub. No.: WO2004/114512

PCT Pub. Date: Dec. 29, 2004

(65) Prior Publication Data

US 2006/0202653 A1    Sep. 14, 2006

(30) Foreign Application Priority Data

Jun. 18, 2003 (JP) .............................. 2003-173200

(51) Int. Cl.
*H02P 7/00* (2006.01)

(52) U.S. Cl. ...................... 318/434; 318/432; 323/274; 323/284

(58) Field of Classification Search ................ 318/434, 318/432; 323/274, 284
See application file for complete search history.

(56) References Cited

U.S. PATENT DOCUMENTS

| | | | | |
|---|---|---|---|---|
| 4,230,976 A | * | 10/1980 | Muller | 318/138 |
| 4,376,261 A | * | 3/1983 | von der Heide et al. | 318/254 |
| 4,782,272 A | * | 11/1988 | Buckley et al. | 318/254 |
| 4,991,772 A | * | 2/1991 | Costa et al. | 239/1 |
| 5,023,527 A | * | 6/1991 | Erdman et al. | 318/254 |
| 5,363,024 A | * | 11/1994 | Hiratsuka et al. | 318/254 |
| 5,506,487 A | * | 4/1996 | Young et al. | 318/811 |
| 5,616,995 A | * | 4/1997 | Hollenbeck | 318/432 |
| 5,717,298 A | * | 2/1998 | Tang et al. | 318/254 |

FOREIGN PATENT DOCUMENTS

| | | | |
|---|---|---|---|
| EP | 1162726 | | 12/2001 |
| JP | WO97/05691 | * | 2/1997 |
| JP | 2002/369576 | | 12/2002 |
| WO | WO 97/05691 | | 2/1997 |

OTHER PUBLICATIONS

International Search Report corresponding to International Application No. PCT/JP2004/006062, dated Sep. 20, 2004.

* cited by examiner

*Primary Examiner*—Rita Leykin
(74) *Attorney, Agent, or Firm*—RatnerPrestia (57) ABSTRACT

A motor driver includes a first signal selector and a second signal selector. The first signal selector is used for selecting a signal to be supplied to an energizing unit of driving coils, and selects either one of a normal energizing pattern signal supplied from an energizing signal generator or a signal from the second signal selector based on a signal from an over-current detector. The second signal selector selects either one of a first non-normal energizing pattern signal from a first energizing signal output unit or a second non-normal energizing pattern signal from a second energizing signal output unit based on a signal from a rotary direction detector.

8 Claims, 6 Drawing Sheets

Normal energizing ⟶ ⟵ Non-normal energizing

FIG. 7 PRIOR ART ably referred to simply as a motor), of which rotor is
MOTOR DRIVER, MOTOR DRIVEN BY THE MOTOR DRIVER, AND APPARATUS EMPLOYING THE MOTOR This application is a U.S. national phase application of PCT International Application PCT/JP2004/006062 dated Apr. 27, 2004.

TECHNICAL FIELD

The present invention relates to a motor driver, motors to be driven by the motor driver, and apparatuses such as air conditioners, air cleaners, and water heaters, which are equipped with the motor.

BACKGROUND ART

A variety of motors employed in, e.g. air conditioners, often use a permanent-magnet brush-less DC motor (hereinafter referred to simply as a motor), of which rotor is equipped with permanent magnets, taking advantage of its long service-life, high reliability, and easy speed control.

A conventional motor driver for driving such a motor as discussed above is disclosed in Japanese Patent Application Non-Examined Publication No. 2002-369576. This motor driver has a structure such that if the rotor is driven in a reverse direction by external force or inertia when the driver is about to start driving the motor, the driver is prohibited from driving the motor. This structure prevents a high current from running through the motor driving coil wound on the stator teeth, so that no demagnetiziation occurs in the rotor magnets.

To be more specific, a control unit disposed in the motor driver detects a rotary direction of the rotor based on changes of a position detecting signal supplied from a Hall sensor prepared in the motor. When the driver is about to start driving the motor, the control unit permits driving the motor and outputs a control signal for turning on transistors in the inverter section provided that the rotor is halted or the rotor rotates in the same direction as the direction the motor is about to rotate along. The output of the control signal entails a driving current to run through the motor driving coils, so that the motor starts rotating.

On the other hand, when the driver is about to start driving the motor, the control unit prohibits the motor from rotating and outputs a control signal for turning off every transistor in the inverter section provided that the rotor rotates in the reverse direction to the direction the motor is about to rotate along. The output of the control signal results in supplying no driving current to the motor driving coils. This structure prevents a high current from running through the motor driving coils, so that no demagnetiziation occurs in the rotor magnets.

Figure 6:
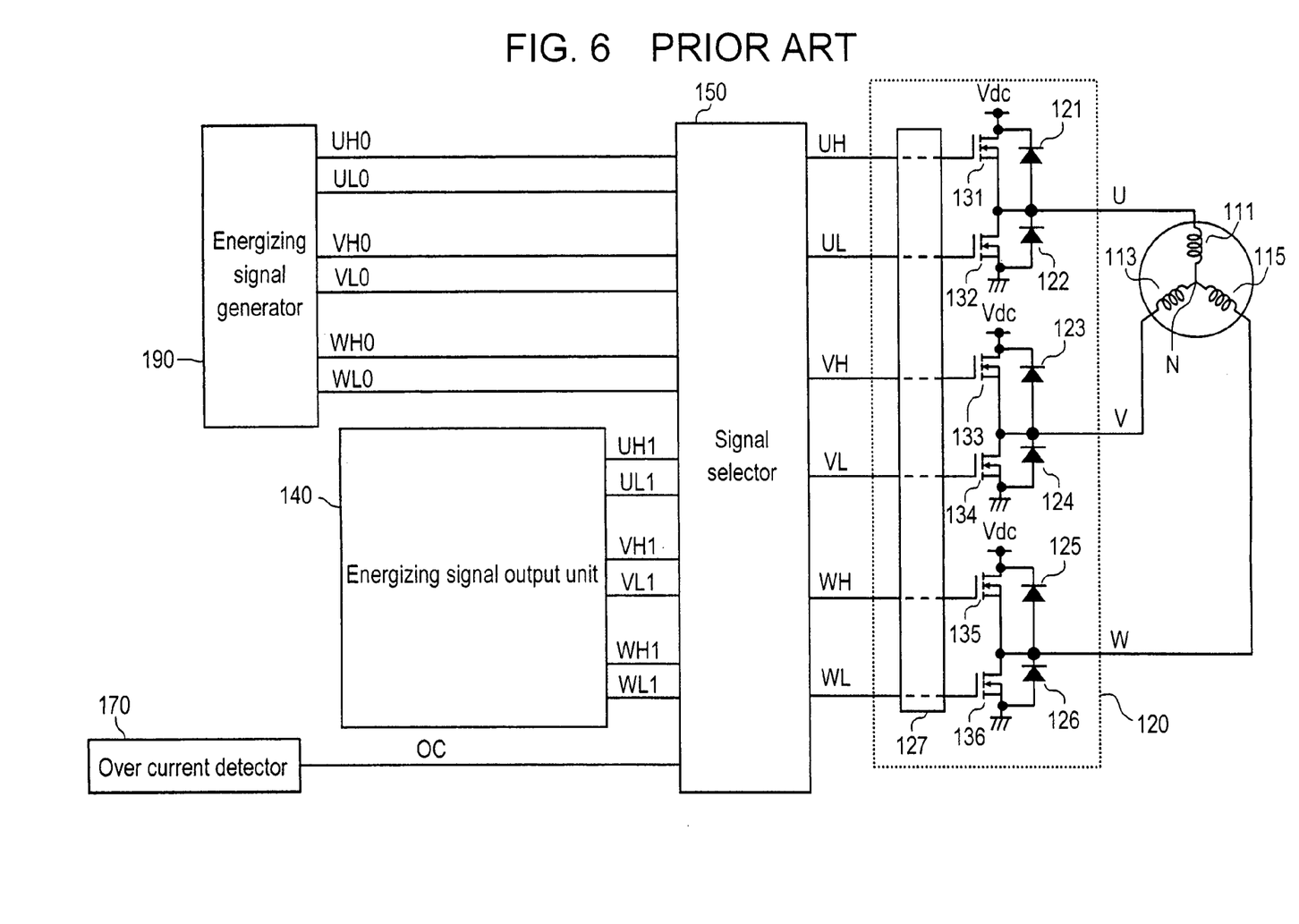
FIG. 6 shows a circuit diagram of a conventional motor driver.
Figure 7:
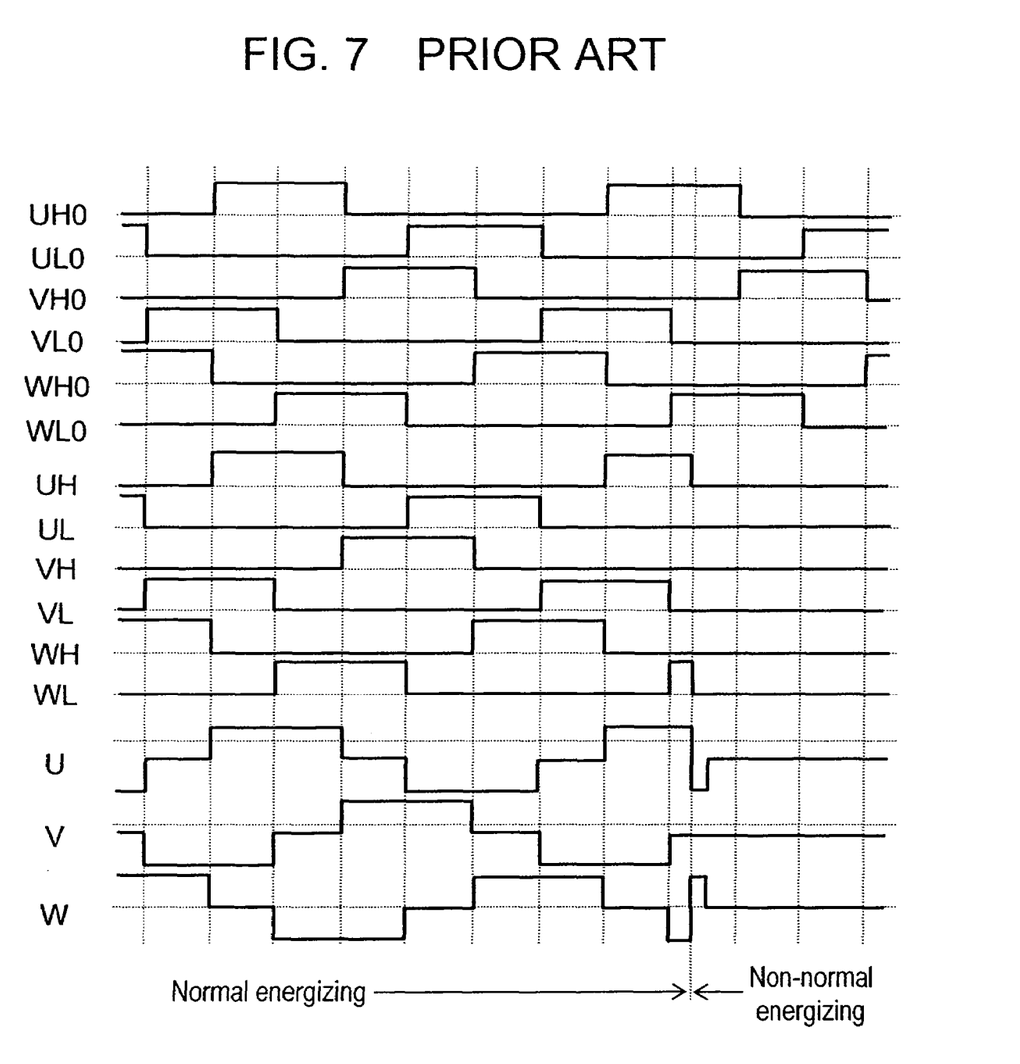
FIG. 7 illustrates an operation of the conventional motor driver shown in FIG. 6.

FIG. 6 shows a circuit diagram of another conventional motor driver, and FIG. 7 shows signal waveforms, of which parts illustrate signals in normal energizing and the remaining part illustrates the signals in non-normal energizing of the motor driver shown in FIG. 6.

As shown in FIG. 6, in the motor driver normally energized, energizing signal generator 190 outputs energizing signals UH0, UL0, VH0, VL0, WH0, and WL0. Those signals control six transistors, 131, 132, 133, 134, 135 and 136 to be turned on or off sequentially. Those six transistors form energizing unit 120. This control entails the current supply to the three-phase driving coils 111, 113 and 115 to be switched sequentially as signals U, V and W shown in FIG. 7, thereby rotating the motor. The driving coils are equipped to the stator of the motor.

The foregoing motor driver stops the current supply to driving coils 111, 113 and 115 when the current supplied to energizing unit 120 increases up to a given value. This action is referred to as non-normal energizing. To be more specific, when the current increases, over current detector 170 outputs signal OC, which is received by signal selector 150. Selector 150 then switches signals supplied from energizing signal generator 190 into signals UH1, UL1, VH1, VL1, WH1, and WL1 supplied from energizing signal output unit 140 before outputting them to energizing unit 120. Those signals supplied from output unit 140 turn off all the transistors 131–136 in energizing unit 120. This mechanism stops the current supply to driving coils 111, 113 and 115.

There are methods other than the foregoing method for stopping the current supply to the driving coils, e.g. supply of a signal to turn on transistors 131, 133, 135 and turn off transistors 132, 134, 136, or the other way around, i.e. to turn on transistors 132, 134, 136 and turn off transistors 131, 133, 135.

However, assume that the latter instance is taken as an example of conventional motor drivers, when all transistors 131–136 in energizing unit 120 are turned off, the energy stored in three-phase driving coils 111, 113 and 115 travels through any one of flywheel diodes 121–126, i.e. runs as a current. This run of current sharply changes voltages U, V and W across the driving coils as shown in FIG. 7. As a result, the driving coils vibrate, which sounds audible and sometimes causes noises. Normal energizing and non-normal energizing repeat at a variety of intervals, so that the repeat causes grating noises if it falls within the audio frequency.

As discussed previously, the another method for stopping the current supply to the driving coils 111, 113 and 115 is available: shorting the driving coils each other by turning on transistors 131, 133, 135 and turning off transistors 132, 134, 136, or the other way around, i.e. turning off transistors 131, 133, 135 and turning on transistors 132, 134, 136. The current supply from power supply Vdc can be halted through those methods; however, back electromotive force (BEMF) is generated in the driving coils during the spin and a current caused by the BEMF will flow.

The methods discussed above have the effect of reducing the current running through the driving coils in the case of positive spin (spin-direction driven by the normal energizing). However, in an apparatus of which fan is driven by a motor, when the fan is rotated in a reverse direction (direction opposite to the normal energizing direction) by some external force such as wind energy, the current running through the driving coils sometimes further increases. The increase of current violates the over-current regulating function that should be activated in the normal energizing state. This violation leaves a problem in actual operation.

DISCLOSURE OF THE INVENTION

The motor driver of the present invention comprises the following elements:

(a) an energizing unit for supplying a current to the driving coils of the motor;

(b) an energizing signal generator for generating a normal generating pattern which the energizing unit performs to the driving coils;

(c) a first energizing signal output unit in which a first non-normal energizing pattern is stored;

(d) a second energizing signal output unit in which a second non-normal energizing pattern different from the first pattern is stored;

(e) a rotary direction detector for detecting a rotary direction of the motor;

(f) an over current detector for detecting a current of the motor;

(g) a first signal selector for selecting a signal to be supplied to the energizing unit; and (h) a second signal selector for selecting a signal to be supplied to the first signal selector.

The first signal selector receives a signal from the energizing signal generator, a signal from the second signal selector, and a signal from the over-current detector, then selects either one of the signal from the energizing signal generator or the signal from the second signal selector based on the signal from the over-current detector before outputting the signal selected.

The second signal selector receives a signal from the first energizing signal output unit, a signal from the second energizing signal output unit, and a signal from the rotary direction detector, then selects either one of the signal from the first energizing signal output unit or the signal from the second energizing signal output unit based on the signal from the rotary direction detector before outputting the signal selected.

The foregoing structure allows decreasing noises while the current regulating function is kept alive against an over current running in the motor.

The present invention also refers to motors driven by the foregoing motor driver, and apparatuses, which include driven sections such as a fan, driven by the motors.

The motors and the apparatuses of the present invention can achieve lowering noises while the current regulating function is kept alive against an over current running in the motor.

BEST MODE FOR PRACTICING THE INVENTION

Figure 1:
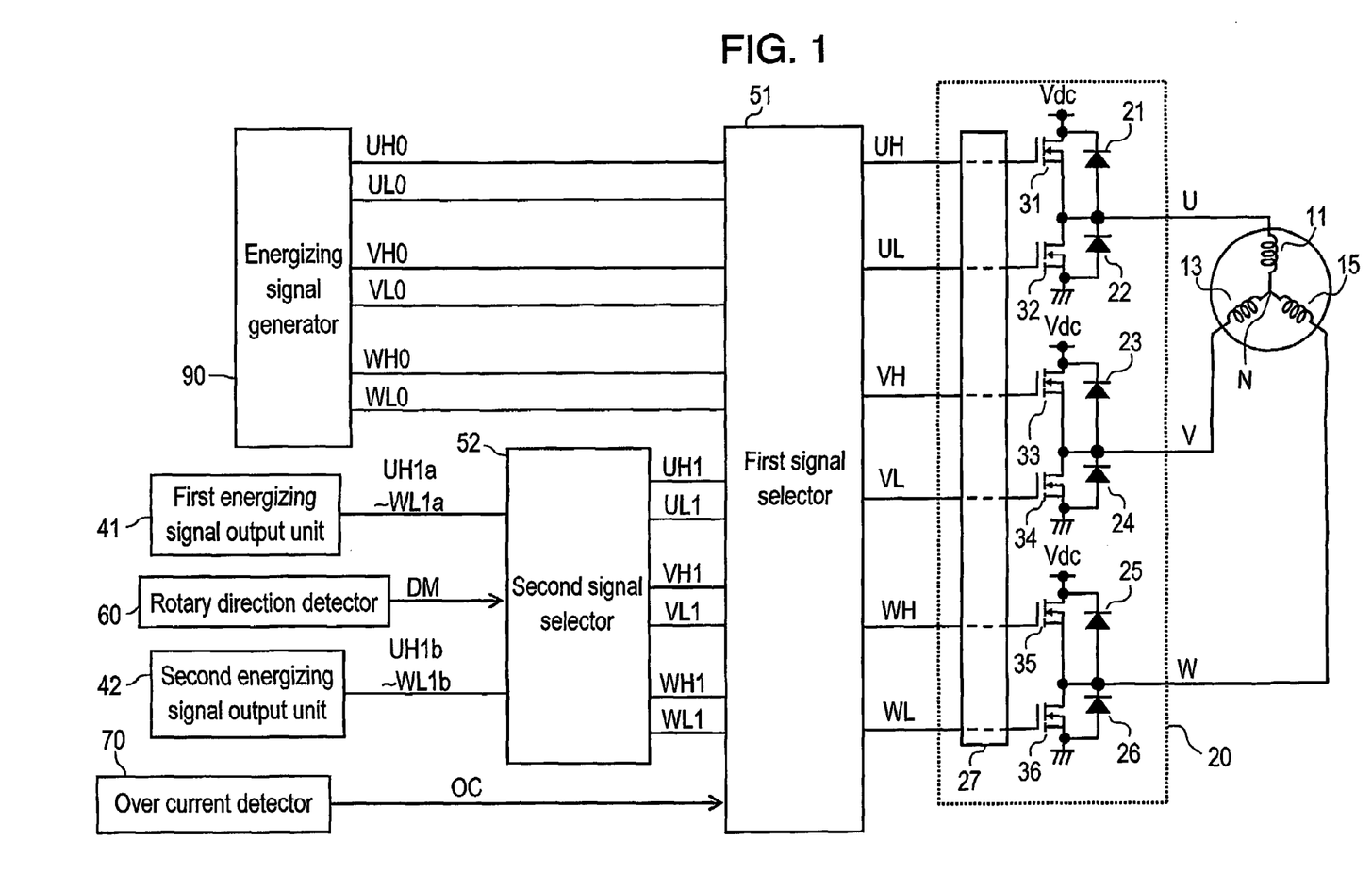
FIG. 1 shows a circuit diagram of a motor driver in accordance with an exemplary embodiment of the present invention.
Figure 2:
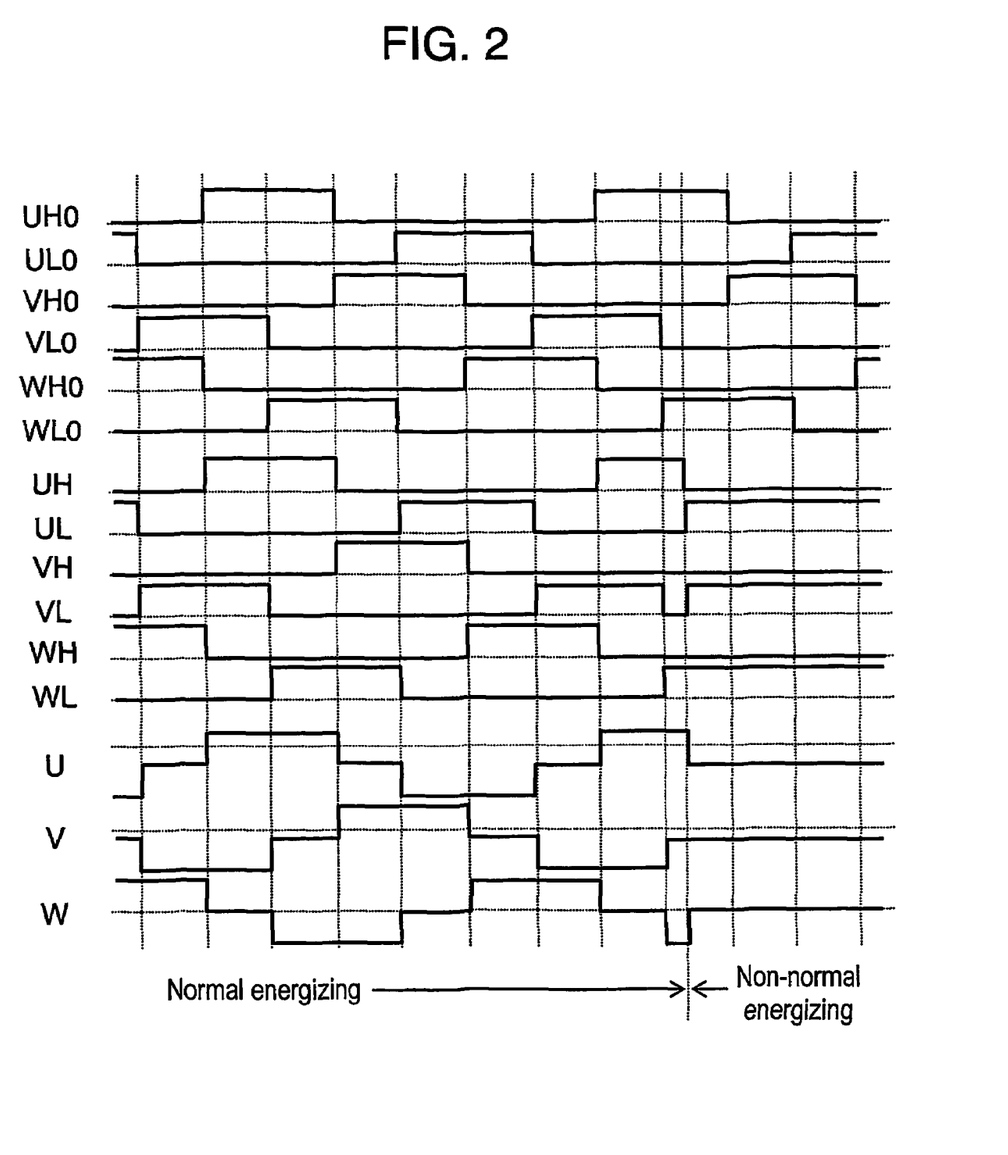
FIG. 2 illustrates an operation of the motor driver shown in FIG. 1.

The exemplary embodiment of the present invention is demonstrated hereinafter with reference to the accompanying drawing. FIG. 1 shows a circuit diagram of a motor driver in accordance with an exemplary embodiment of the present invention, and FIG. 2 illustrates an operation of the motor driver shown in FIG. 1.

The motor driver shown in FIG. 1 in accordance with the exemplary embodiment of the present invention comprises the following elements:

(a) energizing unit 20 for supplying a current to the driving coils of the motor;

(b) energizing signal generator 90 for generating a normal generating pattern which the energizing unit performs to the driving coils;

(c) first energizing signal output unit 41 in which a first non-normal energizing pattern is stored;

(d) second energizing signal output unit 42 in which a second non-normal energizing pattern different from the first pattern is stored;

(e) rotary direction detector 60 for detecting a rotary direction of the motor;

(f) over current detector 70 for detecting a current of the motor;

(g) first signal selector 51 for selecting a signal to be supplied to energizing unit 20; and (h) second signal selector 52 for selecting a signal to be supplied to first signal selector 51.

First signal selector 51 receives a signal from energizing signal generator 90, a signal from second signal selector 52, and a signal from over-current detector 70, then selects either one of the signal from energizing signal generator 90 or the signal from second signal selector 52 based on the signal from over-current detector 70 before outputting the signal selected to energizing unit 20.

Second signal selector 52 receives a signal from first energizing signal output unit 41, a signal from second energizing signal output unit 42, and a signal from rotary direction detector 60, then selects either one of the signal from first energizing signal output unit 41 or the signal from second energizing signal output unit 42 based on the signal from rotary direction detector 60 before outputting the signal selected to first signal selector 51.

In this exemplary embodiment depicted in FIG. 1, a three-phase motor, in which phase-U driving coil 11, phase-V driving coil 13, and phase-W driving coil 15 are coupled like a star, is driven by rectangular energizing waveform having 120 degrees in electrical angles. In the descriptions of this embodiment, the normal energizing refers to the energizing based on an output signal from energizing signal generator 90, and in the normal energizing state, the motor is driven for its original purpose, namely, phase-U, phase-V and phase-W are sequentially driven by rectangular waveforms having 120 degrees in electrical angles.

The non-normal energizing in this embodiment refers to the energizing based on either one of an output signal from first energizing output unit 41, in which a specific energizing pattern (first non-normal energizing pattern) is stored, or second energizing output unit 42, in which an energizing pattern different from the foregoing specific energizing pattern is stored. In other words, the three-phase driving coils are energized differently from the normal energizing status. For instance, the three-phase driving coils become open, i.e. electrically isolated from energizing unit 20, and as a result, the motor is left in free-run status. Another instance is that the three-phase driving coils are shorted with each other, and as a result, the motor is left in braking status.

In energizing unit 20, three energizing elements, e.g. field effect transistors (FET) 31, 33 and 35 form an upper arm, and in a similar manner, another three FET transistors 32, 34, and 36 form a lower arm, so that those six energizing elements form an inverter section.

A first terminal of phase-U driving coil 11 is coupled to a connecting point between transistors 31 and 32. A first terminal of phase-V driving coil 13 is coupled to a connecting point between transistors 33 and 34, and a first terminal of phase-W driving coil 15 is coupled to a connecting point between transistors 35 and 36. Respective second terminals of phase-U coil 11, phase-V coil 13 and phase-W coil 15 are coupled with each other, thereby forming neutral point N.

Between every source and drain of respective transistors 31, 32, 33, 34, 35 and 36, flywheel diodes 21, 22, 23, 24, 25 and 26 are connected respectively. A dc power supply (not shown) applies output voltage Vdc to energizing unit 20, and powers the foregoing three-phase driving coils via energizing unit 20.

Six output signals UH, UL, VH, VL, WH and WL from first signal selector 51 are applied to the respective gates of transistors 31–36 via gate driver 27. Energizing unit 20 is thus formed of gate-driver 27, the six transistors and the six diodes.

Energizing signal generator 90 outputs signals UH0, UL0, VH0, VL0, WH0, and WL0. Those signals stay at level H while the electric angle is kept at 120 degrees, and stay at level L while it is kept at 240 degrees as shown in FIG. 2. During the normal energizing, when signal UH0 stays at level H or level L, signal UH also falls at level H or level L even via first signal selector 51. When signal UL0 stays at level H or level L, signal UL falls at level H or level L even via signal selector 51. When signal VH0 stays at level H or level L, signal VH also falls at level H or level L via signal selector 51. When signal VL0 stays at level H or level L, signal VL also falls at level H or level L via signal selector 51. When signal WH0 stays at level H or level L, signal WH also falls at level H or level L via signal selector 51. When signal WL0 stays at level H or level L, signal WL also falls at level H or level L even via signal selector 51.

Signals UH, UL, VH, VL, WH and WL are applied to the gates of transistors 31, 32, 33, 34, 35 and 36 respectively via gate-driver 27. Those transistors are turned on when corresponding signals UH, UL, VH, VL, WH and WL stay at level H, and turned off when those signals stay at level L.

On the other hand, first energizing signal output unit 41 outputs signals UH1a, UL1a, VH1a, VL1a, WH1a and WL1a. Output unit 41 stores an energizing pattern (a first non-normal energizing pattern) which outputs all of those signals at level L. Those signals become signals UH, UL, VH, VL, WH and WL, all staying at level L, via second signal selector 52 and first signal selector 51.

Signals UH, UL, VH, VL, WH and WL are applied to the gates of transistors 31, 32, 33, 34, 35 and 36 respectively via gate array 27, thereby turning off all transistors 31, 32, 33, 34, 35 and 36. As a result, three-phase driving coils 11, 13 and 15 are isolated from both of the positive side and negative side of the dc power supply, so that all the driving coils become open and fall in non-normal energizing status. At this time, the motor falls in free-run status.

Next, second energizing signal output unit 42 outputs signals UH1b, UL1b, VH1b, VL1b, WH1b and WL1b. Output unit 42 stores an energizing pattern (a second non-normal energizing pattern) which outputs signals UH1b, VH1b and WH1b at level L and signals UL1b, VL1b and WL1b at level H. Those signals become signals UH, VH, WH at level L, and UL, VL, WL at level H via second signal selector 52 and first signal selector 51.

Signals UH, UL, VH, VL, WH and WL are applied to the gates of transistors 31, 32, 33, 34, 35 and 36 respectively via gate-driver 27, so that transistors 31, 33, 35 forming the upper arm of energizing unit 20 are turned off, and transistor 32, 34, 36 forming the lower arm are turned on. Then the respective first terminals of three-phase driving coils 11, 13, 15 are electrically isolated from the positive side of the dc power supply and coupled to the negative side (grounding) of the dc power supply. As a result, driving coils 11, 13, 15 are shorted with each other. At this time, the motor falls in braking status, which is shown as non-normal energizing status in FIG. 2.

Meanwhile, second energizing signal output unit 42 can store the second non-normal energizing pattern, which outputs signals UH1b, VH1b, WH1b at level H, and signals UL1b, VL1b, WL1b at level L. In this case, transistors 31, 33, 35 forming the upper arm of energizing unit 20 are turned on, and transistors 32, 34, 36 forming the lower arm are turned off. Then the respective first terminals of driving coils 11, 13, 15 are electrically isolated from the negative side (grounding) of the dc power supply, and connected to the positive side of the dc power supply. As a result, driving coils 11, 13 and 15 are shorted with each other, and the motor falls in braking status.

Rotary direction detector 60 detects a rotary direction of the motor based on a change of a rotor-position detecting signal supplied from a position sensor disposed in the motor, then outputs given signal DM. Over-current detector 70 detects a current flowing in energizing unit 20, and when detecting a current over a given value, detector 70 outputs given signal OC.

Second signal selector 52 selects either one of a signal from first energizing signal output unit 41 or a signal from second energizing signal output unit 42 based on signal DM supplied from rotary direction detector 60, then outputs the signal selected to first signal selector 51.

First signal selector 51 selects either one of a signal from energizing signal generator 90 or a signal from second signal selector 52 based on signal OC supplied from over-current detector 70, then outputs signals UH, UL, VH, VL, WH, WL to energizing unit 20. Those signals are transformed, at gate driver 27, into voltages adequate for activating transistors 31, 32, 33, 34, 35 and 36, then supplied to the gates of the corresponding transistors.

An operation of the motor driver discussed above is demonstrated hereinafter with reference to FIG. 2, which shows changes of signals at the transition from the normal energizing to the non-normal energizing.

During the normal energizing period, the driving coils of the motor are driven by a rectangular energizing waveform having 120 degrees in electrical angles; however, when over-current detector 70 detects an over-current, the normal energizing is changed to the non-normal energizing. This change is carried out by the following operation of first signal selector 51 based on signal OC supplied from over-current detector 70: During the non-normal energizing period, based on signal OC from over-current detector 70, first signal selector 51 switches output signals UH, UL, VH, VL, WH, WL into signals UH1, UL1, VH1, VL1, WH1, WL1 supplied from second signal selector 52, from signal UH0, UL0, VH0, VL0, WH0, WL0 supplied from energizing signal generator 90 during the normal energizing period.

Further, based on signal DM supplied then from rotary direction detector 60, second signal selector 52 selects as output signals UH1, UL1, VH1, VL1, WH1, WL1 either one of UH1a, UL1a, VH1a, VL1a, WH1a, WL1a (first non-normal energizing pattern) supplied from first energizing signal output unit 41 or UH1b, UL1b, VH1b, VL1b, WH1b, WL1b (second non-normal energizing pattern) supplied from second energizing signal output unit 42.

The motor driven by the motor driver of the present invention is mounted, e.g. in an outdoor unit of an air-conditioner, and assume that its driving object (driven unit) is a fan. Then it is possible that the fan is rotated in a reverse direction (opposite to a driving direction by the normal energizing waveform) by a strong blow such as typhoon, and the motor thus rotates in the reverse direction.

In this state, when over-current detector 70 detects an over current, turning off all transistors 31–36 of energizing unit 20 can reduce the current running through driving coils 11, 13, 15. Therefore, second signal selector 52 selects a signal (the first non-normal energizing pattern) from first energizing signal output unit 41, and first signal selector 51 selects a signal (in this case, the first non-normal energizing pattern) from second signal selector 52, thereby turning off all transistors 31–36 of energizing unit 20. The function of current regulation to the driving coils is thus alive. This operation is similar to that of the prior art, and accompanied by audible noises; however, it is rare that the motor rotates in a reverse direction caused by a strong blow, and yet, the strong blow produces other noises which can cancel the audible noises.

Next, during the positive rotation (rotated by the normal energizing waveform) of the motor, when the motor current increases and an over current is detected, second signal selector 52 selects a signal from second energizing signal output unit 42 (the second non-normal energizing pattern). Further, first signal selector 51 selects a signal supplied from second signal selector 52 (in this case, the second non-normal energizing pattern). Those selections turns off transistors 31, 33, 35 forming the upper arm of energizing unit 20, and turns on transistors 32, 34, 36 forming the lower arm. As a result, driving coils 11, 13, 15 are isolated from the positive side of the dc power supply, and those coils are shorted with each other. As such, in the case of positive rotation, it is not necessarily to turn off all the transistors for reducing the coil current, and the current regulation still effectively works. This operation does not involve drastic changes in voltages U, V, W applied to the driving coils as shown in FIG. 2, so that the noises can be suppressed.

As discussed above, the present invention can reduce noises while the current regulating function is kept alive at an over-current in the motor.

A variety of signal-processing in this embodiment can be done by hardware, such as analog or digital circuitry. They can be done also by software using a microcomputer, digital signal processor (DSP). The signal processing circuit can be integrated into an IC or an LSI.

The exemplary embodiment discussed above is not only effective when a motor is driven by a rectangular energizing waveform having 120 degrees in electrical angles, but also effective driven by other waveforms, e.g. 150 degrees in electrical angles or sine energizing waveform. This embodiment is also effective when the pulse width modulation (PWM) driving or pulse amplitude modulation (PAM) driving is used.

Next, several examples of motors driven by the motor driver of the present invention and apparatuses employing non-driving parts, e.g. a fan, driven by the motor are described hereinafter. In the following descriptions, the motor driver is independent of the motor; however, it can incorporate the motor.

Figure 3A:
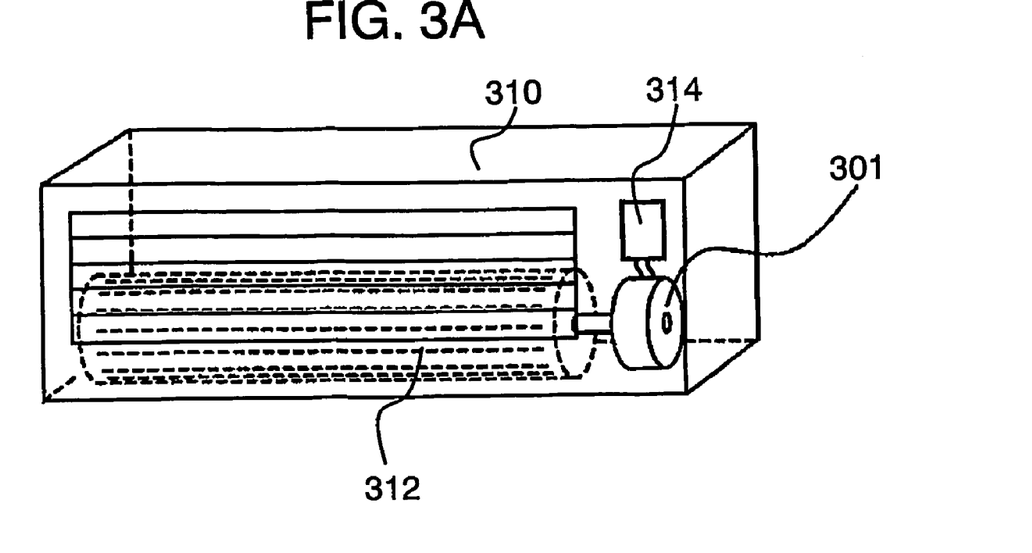
FIG. 3A shows a structure of an indoor unit of an air-conditioner in accordance with an exemplary embodiment of the present invention.
Figure 3B:
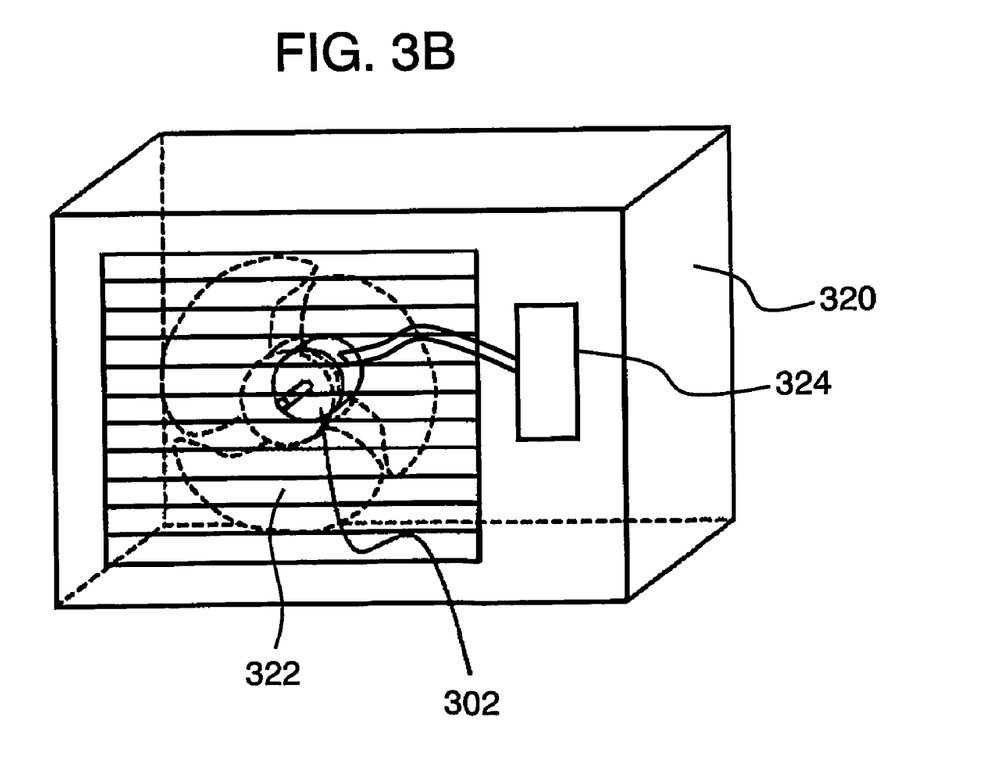
FIG. 3B shows a structure of an outdoor unit of an air-conditioner in accordance with an exemplary embodiment of the present invention.

FIG. 3A shows a structure of an indoor unit of an air-conditioner in accordance with this embodiment of the present invention, and FIG. 3B shows a structure of an outdoor unit of the air-conditioner in accordance with the embodiment.

In FIG. 3A, indoor unit 301 includes motor 301 therein, and cross-flow fan 312, which is a driven part, is attached to the shaft of motor 301 driven by motor driver 314. Motor driver 314 powers motor 301 to spin, which is accompanied by spinning of cross-flow fan 312. The spin of fan 312 blows the air conditioned by an indoor heat exchanger (not shown) into the room. Use of the motor driver demonstrated in the foregoing embodiment as motor driver 314 allows reducing noises of the indoor unit while the current regulating function is kept alive at an over current in the motor.

In FIG. 3B, outdoor unit 320 includes motor 302 therein, and propeller fan 322, which is a driven part, is attached to the shaft of motor 302 driven by motor driver 324. Motor driver 324 powers motor 302 to spin, which is accompanied by spinning of propeller fan 322. The spin of fan 322 blows the air to an outdoor heat exchanger (not shown). Use of the motor driver demonstrated in the foregoing embodiment as motor driver 324 allows reducing noises of the outdoor unit while the current regulating function is kept alive at an over current in the motor.

Figure 4:
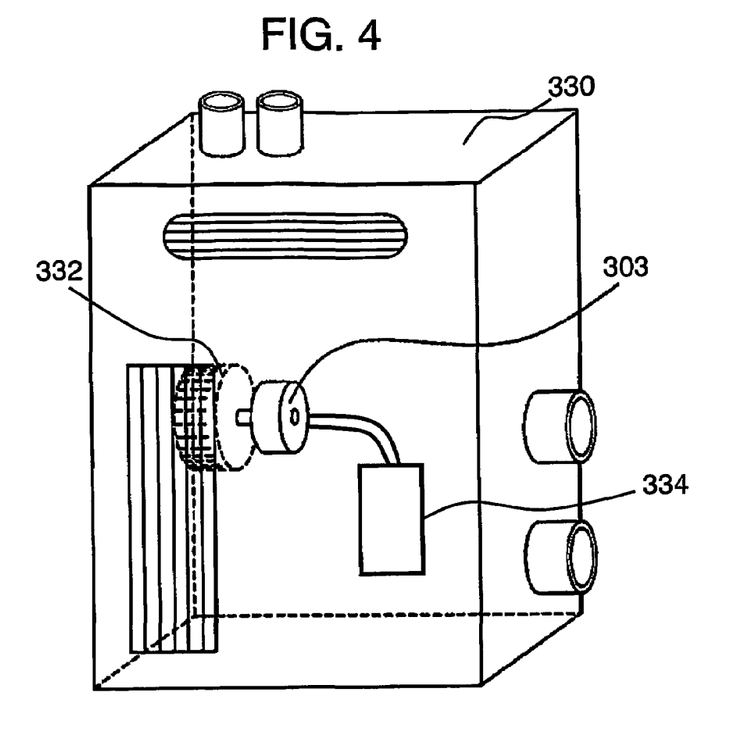
FIG. 4 shows a structure of a water heater in accordance with an exemplary embodiment of the present invention.

FIG. 4 shows a structure of a water heater in accordance with this embodiment of the present invention. In FIG. 4, water heater 330 includes motor 303 therein, and fan 332, which is a driven part, is attached to the shaft of motor 303 driven by motor driver 334. Motor driver 334 powers motor 303 to spin, which is accompanied by spinning of fan 332. The spin of fan 332 blows the air necessary for combustion to a fuel vaporizing chamber (not shown). Use of the motor driver demonstrated in the foregoing embodiment as motor driver 334 allows reducing noises of the water heater while the current regulating function is kept alive at an over current in the motor.

Figure 5:
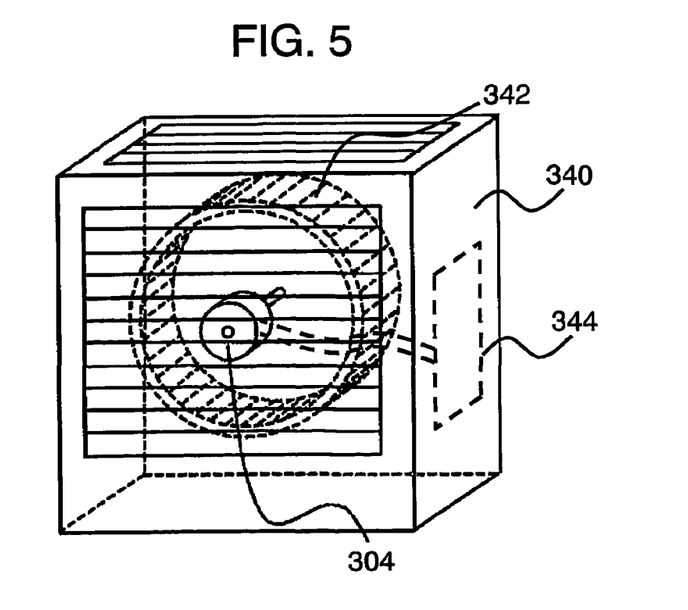
FIG. 5 shows a structure of an air cleaner in accordance with an exemplary embodiment of the present invention.

FIG. 5 shows a structure of an air cleaner in accordance with this embodiment of the present invention. In FIG. 5, air cleaner 340 includes motor 304 therein, and air circulating fan 342, which is a driven part, is attached to the shaft of motor 304 driven by motor driver 344. Motor driver 344 powers motor 304 to spin, which is accompanied by spinning of fan 342. The spin of fan 342 circulates the air. Use of the motor driver demonstrated in the foregoing embodiment as motor driver 344 allows reducing noises of the water heater while the current regulating function is kept alive at an over current in the motor.

As discussed above, use of the motor driven by the motor driver of the present invention in a variety of apparatuses allows reducing noises of the apparatuses while the current regulating function is kept alive at an over current in the motor.

INDUSTRIAL APPLICABILITY

The motor driver of the present invention comprises the following elements: (a) an energizing unit for supplying a current to the driving coils of the motor; (b) an energizing signal generator for generating a normal generating pattern; (c) a first energizing signal output unit in which a first non-normal energizing pattern is stored; (d) a second energizing signal output unit in which a second non-normal energizing pattern different from the first pattern is stored; (e) a first signal selector for selecting a signal to be supplied to the energizing unit; (f) a second signal selector for selecting a signal to be supplied to the first signal selector;

(g) a rotary direction detector for detecting a motor rotating direction; and (h) an over current detector for detecting an over current of the motor.

The first signal selector selects either one of the signal from the energizing signal generator or the signal from the second signal selector based on the signal from the over-current detector before outputting the signal selected. The second signal selector selects either one of the signal from the first energizing signal output unit or the signal from the second energizing signal output unit based on the signal from the rotary direction detector before outputting the signal selected.

Use of the motor, which is driven by the motor driver of the present invention, in a variety of apparatuses allows reducing noises of the apparatuses while the current regulating function is kept alive at an over current in the motor.

The invention claimed is:

1. A motor driver comprising:
   (a) an energizing unit for supplying a current to a driving coil of a motor;
   (b) an energizing signal generator for generating a normal generating pattern which the energizing unit performs to the driving coil;
   (c) a first energizing signal output unit in which a first non-normal energizing pattern is stored;
   (d) a second energizing signal output unit in which a second non-normal energizing pattern different from the first pattern is stored;
   (e) a rotary direction detector for detecting a rotary direction of the motor;
   (f) an over current detector for detecting a current of the motor;
   (g) a first signal selector for selecting a signal to be supplied to the energizing unit; and
   (h) a second signal selector for selecting a signal to be supplied to the first signal selector,
   wherein the first signal selector receives a signal from the energizing signal generator, a signal from the second signal selector, and a signal from the over-current detector, then selects either one of the signal from the energizing signal generator or the signal from the second signal selector based on the signal from the over-current detector before outputting the signal selected,
   wherein the second signal selector receives a signal from the first energizing signal output unit, a signal from the second energizing signal output unit, and a signal from the rotary direction detector, then selects either one of the signal from the first energizing signal output unit or the signal from the second energizing signal output unit based on the signal from the rotary direction detector before outputting the signal selected.

2. The motor driver of claim 1, wherein the first non-normal energizing pattern is used for controlling an energizing element in the energizing unit so that the driving coil can be opened, and the second non-normal energizing pattern is used for controlling the energizing element in the energizing unit so that the driving coil can be shorted with each other.

3. A motor driven by the motor driver as defined in claim 1.

4. A motor driven by the motor driver as defined in claim 2.

5. An apparatus including a driven part which is driven by the motor as defined in claim 3.

6. An apparatus including a driven part which is driven by the motor as defined in claim 4.

7. The apparatus as defined in claim 5, wherein the driven part is a fan.

8. The apparatus as defined in claim 6, wherein the driven part is a fan.

* * * * *